United States Patent
Shen et al.

(10) Patent No.: US 10,516,549 B2
(45) Date of Patent: Dec. 24, 2019

(54) MULTICAST SERVICE WITH IS-IS SPINE-LEAF EXTENSION IN A FABRIC NETWORK

(71) Applicant: CISCO TECHNOLOGY, INC., San Jose, CA (US)

(72) Inventors: Naiming Shen, Santa Clara, CA (US); Stig I. Venaas, Oakland, CA (US); Ashutosh Gupta, Dublin, CA (US)

(73) Assignee: Cisco Technology, Inc., San Jose, CA (US)

( * ) Notice: Subject to any disclaimer, the term of this patent is extended or adjusted under 35 U.S.C. 154(b) by 375 days.

(21) Appl. No.: 15/226,734

(22) Filed: Aug. 2, 2016

(65) Prior Publication Data

US 2018/0041360 A1 Feb. 8, 2018

(51) Int. Cl.
*H04L 12/44* (2006.01)
*H04L 12/18* (2006.01)
*H04L 12/743* (2013.01)

(52) U.S. Cl.
CPC ............ *H04L 12/44* (2013.01); *H04L 12/185* (2013.01); *H04L 12/1886* (2013.01); *H04L 45/7453* (2013.01)

(58) Field of Classification Search
CPC ... H04L 12/185; H04L 12/1886; H04L 12/44; H04L 45/7453
USPC ........................................................ 370/256
See application file for complete search history.

(56) References Cited

U.S. PATENT DOCUMENTS

| | | | | |
|---|---|---|---|---|
| 6,636,895 B1 * | 10/2003 | Li | .......................... | H04L 45/02 370/351 |
| 2012/0044940 A1 * | 2/2012 | Katz | ...................... | H04L 2/462 370/400 |
| 2012/0324229 A1 * | 12/2012 | Buldas | .................... | H04L 9/321 713/176 |
| 2013/0113608 A1 * | 5/2013 | Subramanian | ...... | H04L 41/0823 340/10.1 |
| 2013/0121298 A1 * | 5/2013 | Rune | ................. | H04L 29/12066 370/329 |
| 2014/0126575 A1 * | 5/2014 | Janneteau | ............... | H04L 45/34 370/390 |

(Continued)

FOREIGN PATENT DOCUMENTS

EP  3223476 A1 *  9/2017  ............. H04L 45/02

OTHER PUBLICATIONS

L.Yong, IGP Multicast Architecture, Nov. 9, 2014, Network Working Group (Year: 2014).*

(Continued)

*Primary Examiner* — Mark H Rinehart
*Assistant Examiner* — Kokou R Detse

(57) ABSTRACT

Aspects of the embodiments are directed to systems, methods, and network elements executing instructions stored thereon. Aspects are directed to, for each spine node connected to a leaf node network element, identifying a spine router identifier, identifying a multicast group address, computing a plurality of hash values based on a hash function using the spine router identifier and the multicast group address, identifying a root spine node based on a highest hash value from the plurality of hash values; and transmitting an IS-IS message to root spine node indicating election of spine node as the root spine node.

20 Claims, 8 Drawing Sheets

(56) References Cited

U.S. PATENT DOCUMENTS

2015/0124642 A1* 5/2015 Pani ............... H04L 12/18
370/254
2016/0227029 A1* 8/2016 Wolfeld ............ H04M 3/42221

OTHER PUBLICATIONS

Anja Feldmann, IP Network Configuration for Intradomain Traffic, Sep.-Oct. 2001 IEEE. (Year: 2001).*
N.Shen, IS-IS Routing for Spine-Leaf Topology, Nov. 2, 2015, Network Working Group (Year: 2015).*
Jack. Wybenga, Routing Coordination Protocol, Nov. 7, 2002, Samsung Electronics (Year: 2002).*
Shen, N., et al., "IS-IS Routing for Spine-Leaf Topology," Network Working Group, Internet-Draft, Nov. 2, 2015, 12pages; https://tools.ietf.org/pdf/draft-shen-isis-spine-leaf-ext-00.pdf.
Fedyk, D., et al., "IS-IS Extensions Supporting IEEE 802.1aq Shortest Path Bridging," Internet Engineering Task Force (IETF), RFC 6329, Apr. 2012, 37 pages; https://tools.ietf.org/pdf/rfc6329.pdf.
Yong, L., et al., "IGP Multicast Architecture," Network Working Group Internet Draft, draft-yong-rtgwg-igp-multicast-arch-01, Nov. 9, 2014; 14 pages.

* cited by examiner

```
 500
     0                   1                   2                   3
     0 1 2 3 4 5 6 7 8 9 0 1 2 3 4 5 6 7 8 9 0 1 2 3 4 5 6 7 8 9 0 1
    +-+-+-+-+-+-+-+-+-+-+-+-+-+-+-+-+-+-+-+-+-+-+-+-+-+-+-+-+-+-+-+-+
    |      Type     |     Length    |            SL Flag            |
    +-+-+-+-+-+-+-+-+-+-+-+-+-+-+-+-+-+-+-+-+-+-+-+-+-+-+-+-+-+-+-+-+
    |                      Default Route Metric                     |
    +-+-+-+-+-+-+-+-+-+-+-+-+-+-+-+-+-+-+-+-+-+-+-+-+-+-+-+-+-+-+-+-+
    |                       .. Optional Sub-TLVs                    |
    +-+-+-+-+-+-+-+-+-+-+-+-+-+-+-+-+-+-+-+-+-+-+-+-+-+-+-+-+-+-+-+-+
```

FIG. 5A

```
                                                              550
      0                   1
      0 1 2 3 4 5 6 7 8 9 0 1 2 3 4 5
     +-+-+-+-+-+-+-+-+-+-+-+-+-+-+-+-+
     |          Reserved       |B|R|L|
     +-+-+-+-+-+-+-+-+-+-+-+-+-+-+-+-+
```

702 Receive IS-IS Hello PDU from leaf node(s) with Root election for IP multicast group 704 Spine node "joins" internal multicast group as root spine node 706 Spine accepts root status?

710 NO → Advertise denial of root status through the IS-IS hello PDU to leaf nodes 708 YES → Spine node floods connected spine nodes with IS-IS LSP indicating that spine node is root 712 Spine node runs PIM protocol among spine nodes 714 Multiple segments and roots?

722 YES → Spine nodes elects PIM RP using highest result from hash function

724 Unelected spine nodes in group join rendezvous point for multicast group

716 NO → Spine node receives multicast packet

718 Spine node transmits multicast packet to leaf nodes that designated spine node as root (via IS-IS hello PDU)

720 Spine node replicates multicast packet along PIM tree in spine/core layer

MULTICAST SERVICE WITH IS-IS SPINE-LEAF EXTENSION IN A FABRIC NETWORK

FIELD

This disclosure pertains to multicast service with intermediate system to intermediate system (IS-IS) Spine-leaf extension in a fabric network.

BACKGROUND

In Spine-Leaf type of topology, it is not necessary to have leaf nodes containing topology and routing information in unicast and multicast of the other nodes in the network. The resources on leaf nodes can be constrained. The current interior gateway protocol (IGP) and multicast solutions in data centers relies on the IGP database to be flooded to every node in network, including the leaf nodes.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts.

FIG. 5A is a schematic illustration of an example packet extension in accordance with embodiments of the present disclosure.

FIG. 5B is a schematic diagram of an SL flag 550 in accordance with embodiments of the present disclosure.

FIG. 7 is a process flow diagram for a Spine node serving as a Root node in accordance with embodiments of the present disclosure.

DETAILED DESCRIPTION

This disclosure describes utilizing an IS-IS Spine-Leaf extension to minimize the resources on the leaf nodes in the network, such utilization also being applicable to multicast routing. The leaf nodes use a hash function to convert customer multicast into internal IP multicast groups. The leaf nodes can elect a multicast "Root" Spine node, and inform the elected Spine node through IS-IS hello packets or through an Internet Group Management Protocol (IGMP) join message. Those IS-IS hello election information from the leaf nodes serve as "Join" onto the Spine nodes for the internal fabric IP multicast group addresses. Spine nodes will advertise an internal multicast group "Root" status and an IS-IS link state packet (LSP). Spine nodes run IP protocol independent multicast (PIM) protocol among themselves. Spine nodes elect the PIM rendezvous point (RP) for the multicast group among the Spine nodes. Non-RP "Root" Spine nodes can join the multicast group towards the RP though the normal PIM in the Spine layer. The "Root" Spine node is responsible for replicating to all the members of the group. Node failure and link failure can be quickly repaired by leaf nodes electing a new "Root" Spine node for the multicast group and informing that "Root" Spine node through an IS-IS hello procedure or through an IGMP join procedure.

In this disclosure, network leaf nodes do not carry topology information, unicast routes, or multicast group information of other nodes. The Spine nodes have complete unicast and multicast information.

The IS-IS Spine-Leaf extension for unicast routing is described in detail in "IS-IS Routing for Spine-Leaf Topology," draft-shen-isis-Spine-leaf-ext-00, IETF Network Working Group, the entire contents of which are incorporated by reference. This disclosure describes the multicast aspect of the Spine-leaf optimization in data center and campus networks.

Figure 1:
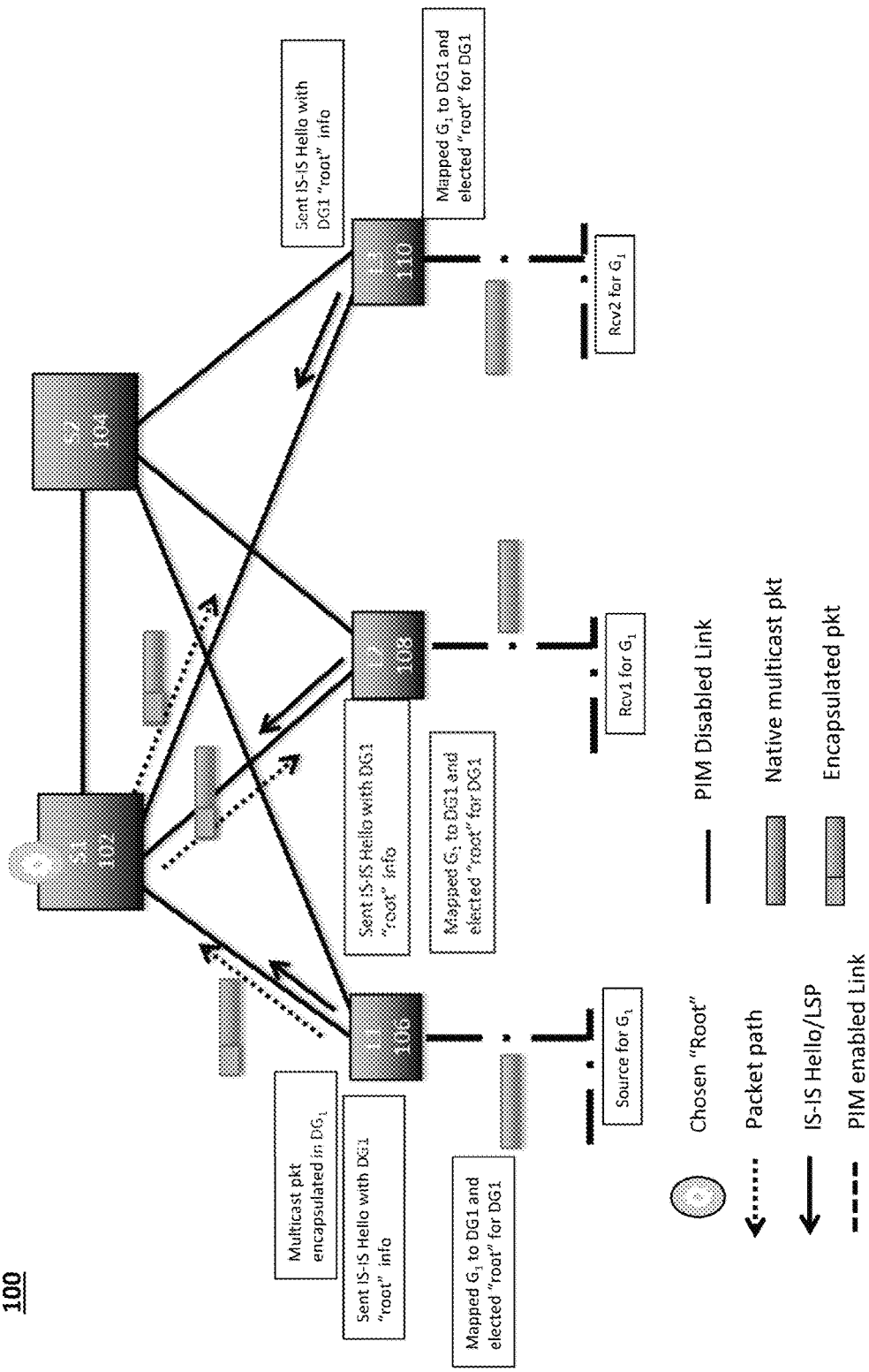
FIG. 1 is a schematic illustration of a Spine-leaf topology in accordance with embodiments of the present disclosure.

FIG. 1 is a schematic illustration of a Spine-leaf topology 100 in accordance with embodiments of the present disclosure. The Spine-leaf topology 100 is an example representation using two Spine nodes: Spine1 102 and Spine2 104. Spine1 102 and Spine2 104 are configured for IS-IS operation. The Spine-leaf topology 100 also includes a plurality of leaf nodes (e.g., top of rack switches), including L1 106, L2 108, and L3 110. Leaf nodes L1 106, L2 108, and L3110 are configured as IS-IS leaf nodes as described above. It is understood that the Spine-leaf topology 100 may include more than two Spine nodes and more than three leaf nodes, and that FIG. 1 provides an example illustration.

The leaf nodes L1 106, L2 108, and L3 110 can each send an IS-IS hello message to Spine1 102 indicating that Spine1 102 has been elected as the Root Spine node (described below).

Figure 2:
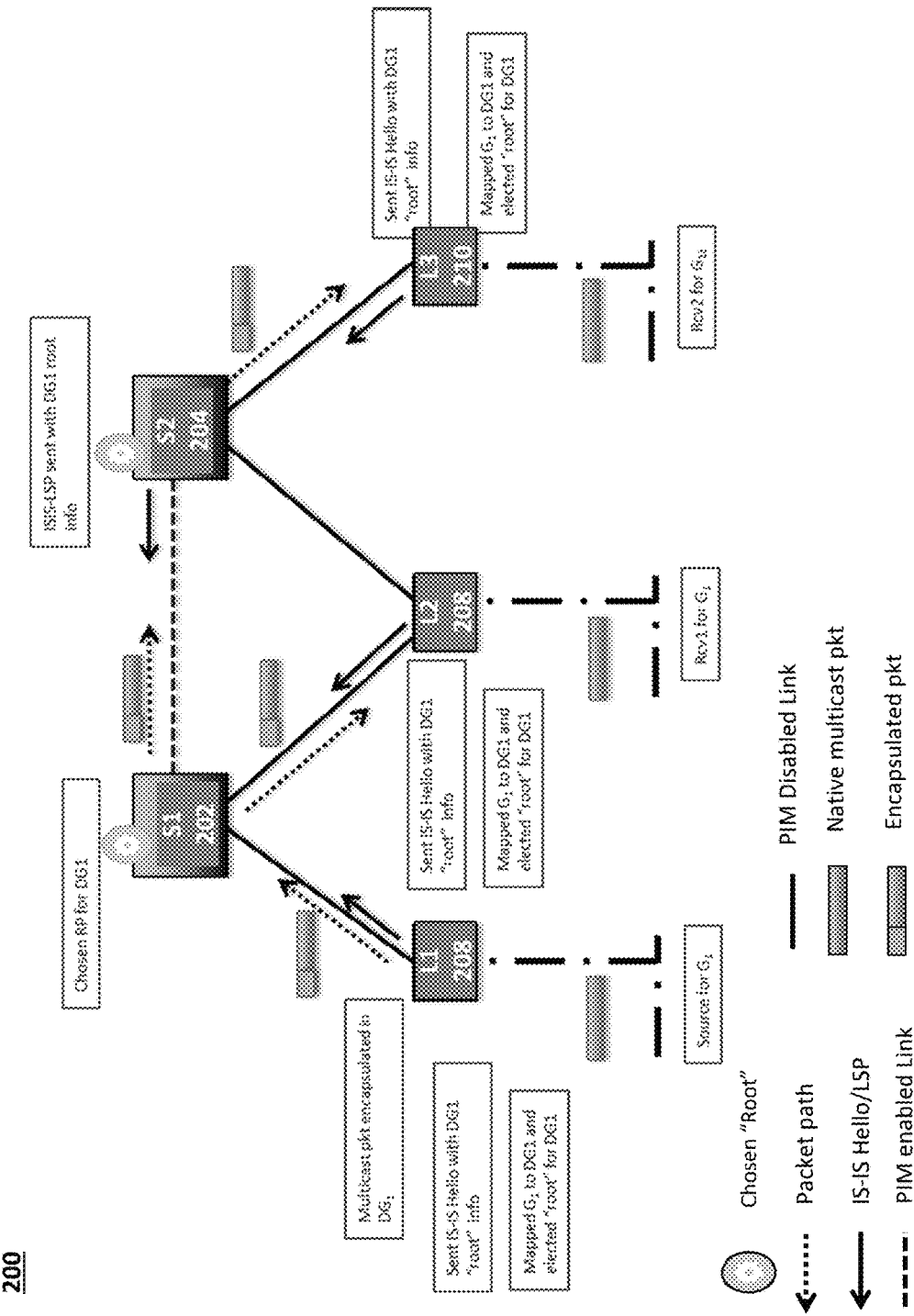
FIG. 2 is a schematic diagram of a partially connected Spine-leaf topology in accordance with embodiments of the present disclosure.

Turning briefly to FIG. 2, in some embodiments, a leaf node may not be connected to Spine1. FIG. 2 is a schematic diagram of a partially connected Spine-leaf topology 200 in accordance with embodiments of the present disclosure. In FIG. 2, Spine 2 104 can serve as an intermediate Root node for leaf node L3 210. L3 210 can send an IS-IS hello with DG1 Root information to Spine2 204. Spine2 204 can send an IS-IS LSP with DG1 Root information from leaf node L3 210. Spine1 202 and Spine2 204 can communicate across an enabled PIM link.

Spine1 202 can route encapsulated packets for multicast to leaf node L3 210 through Spine2 204.

Internal fabric IP multicast groups are used for encapsulating customer multicast packets. A first leaf node L1 106 can receive a multicast packet intended for multicast group 1 (G1). When Internet Group Management Protocol (IGMP) snooping gets a new customer multicast address from the received packet, based on the hash function, the leaf node L1 106 will obtain the mapped internal fabric IP multicast group address, where G1 is mapped to DG1 and to the Spine node Spine1 102 that is elected as the Root for DG1. The multicast packet can be encapsulated in DG1.

In embodiments, the leaf node can send the "Root" election of the internal fabric IP multicast group to spine node through an IGMP Join message for the internal fabric IP multicast group. The Spine node can receive this IGMP join and will become the 'Root' for this internal group, in a similar manner as if it had received the IS-IS Hello PDU packet.

The Spine1 102 can transmit the encapsulated packet to other leaf nodes as per the internal multicast destination addressing from the packet.

Returning to FIG. 1, it is assumed that leaf node L1 106 has N uplink Spine node connections. Leaf node 106 performs a hash using the Spine node IS-IS router-ID and the mapped internal fabric IP multicast group to generate a list of numerical numbers. The highest number resulting from the hashing corresponding to the Spine node will be the multicast "Root" for this internal fabric IP multicast group. The leaf node uses IS-IS hello PDU to inform the Spine nodes of the elected "Root" spine node for this internal multicast group. In the case where any leaf nodes connecting to all the Spine nodes, then there is only one "Root" in the network for a group. If the network is partitioned to multiple sections of Spine-Leaf topology, then there may be multiple "Root" for each internal multicast group.

Among the Spine layer nodes, the "Root" Spine for a group will use IS-IS LSP to advertise its "Root" status for the group, and this "Root" status will be flooded among all the Spine nodes. Another hash similar to how the leaf node elect the "Root" for the group, all the "Root" nodes will elect the PIM RP automatically. There will be no operator involvement in this PIM RP decision for a multicast group. If there is another "Core" layer on top of the Spine layer and the "Core" switches are not directly connected to the leaf nodes. The network admin has to configure some of the "Core" nodes to be the "Root" and with higher priority for election, if the intention is to use the Core nodes as the PIM RP. If one of the "Core" fails, the new PIM RP will be automatically reelected.

Spine nodes can be connected among themselves. For example Spine1 102 can be connected to Spine2 104 (e.g., via an enabled PIM link or other type of connection). The Spine layer can be running a normal IS-IS scheme under this extension. In this disclosure, the Spine layer also runs PIM protocol on the Spine nodes (as shown in FIG. 2). The internal fabric IP multicast tree is built for the purpose of multiple "Roots," where there are multiple sections of segregated Spine-Leaf topology. The PIM RP for an internal fabric IP multicast group can be elected by the hash function elect the "RP" for the group. This works either in the case of inter-connected Spine nodes, and also in the case of there is another "Core" layer to inter-connect the Spine layer.

The internal fabric IP multicast groups not only serve for encapsulating the customer IP multicast groups, but also for customer unknown unicast packets, layer2 multicast and broadcast packets.

The hash function for internal multicast group selection can be a function of VLAN interfaces. The hash function to generate the internal fabric IP multicast group from customer IP multicast group can be expressed as Internal-Mcast-Group#=func(VLAN-ID,Mcast-Group#).

The unknown unicast, broadcast, and layer2 multicast can also be converted into the same set of internal fabric IP multicast groups. The conversion for example can be expressed as Internal-Mcast-Group#=func(VLAN-ID, 0). In this case, the customer IP multicast group is zero, and only the VLAN-ID of the unknown unicast packet is used for the hash function.

In FIG. 1, Spine2 104 can store a full IS-IS database. L3 110 can store default routes to all Spines. Leaf node switches will form normal local link state packets (LSPs) and flood to Spine switches, but Spine switches will not relay the LSPs to other leaf nodes. Leaf node switches can use default gateways to each of the Spine switches. But the leaf nodes do not have full network topology view. Spine nodes are inter-connected, and have fully functional IS-IS operation for unicast routing.

Spine nodes 102 and 104 can form normal PIM relationship. Spine1 102 be the RP for multicast group "DG1," in accordance to the above. Spine nodes 102 and 104 can also exchange IS-IS LSP.

The leaf nodes can elect a Root Spine node, as described below, and use a return Hello packet to signal to a Spine node that it has been elected as a Root RP for a first group.

For example, L1 106 can flood the Spine1 102 and other Spine nodes an IS-IS LSP. The leaf node can send an IS-IS hello message to Spine1 102 indicating that Spine1 is the Root RP for group "Red." The Spine2 104 can advertise Spine nodes can send a Root indication for the overlay groups through IS-IS hello to the leaf nodes. In embodiments, the leaf node can send an IGMP join message that indicates to the spine node that the spine node has been selected as a root for the internal fabric IP multicast group.

L3 110 can receive an IS-IS hello message from Spine2 104 indicating that Spine2 is a default gateway (as shown in FIG. 1). In FIG. 2, L3 110 can send an IS-IS Hello message indicating that Spine2 104 is the Root RP for group "G1."

Internet Group Management Protocol (IGMP) snooping on leaves, and convert with deterministic hash for the overlay group. IS-IS LSP of leaf nodes will put their existing overlay membership in packets to be advertised to Spine nodes. IS-IS on Spines will advertise their Root inside IS-IS LSP. IS-IS LSPs are transmitted only from Leaf to Spine, but not from Spine to Leaf.

Figure 3:
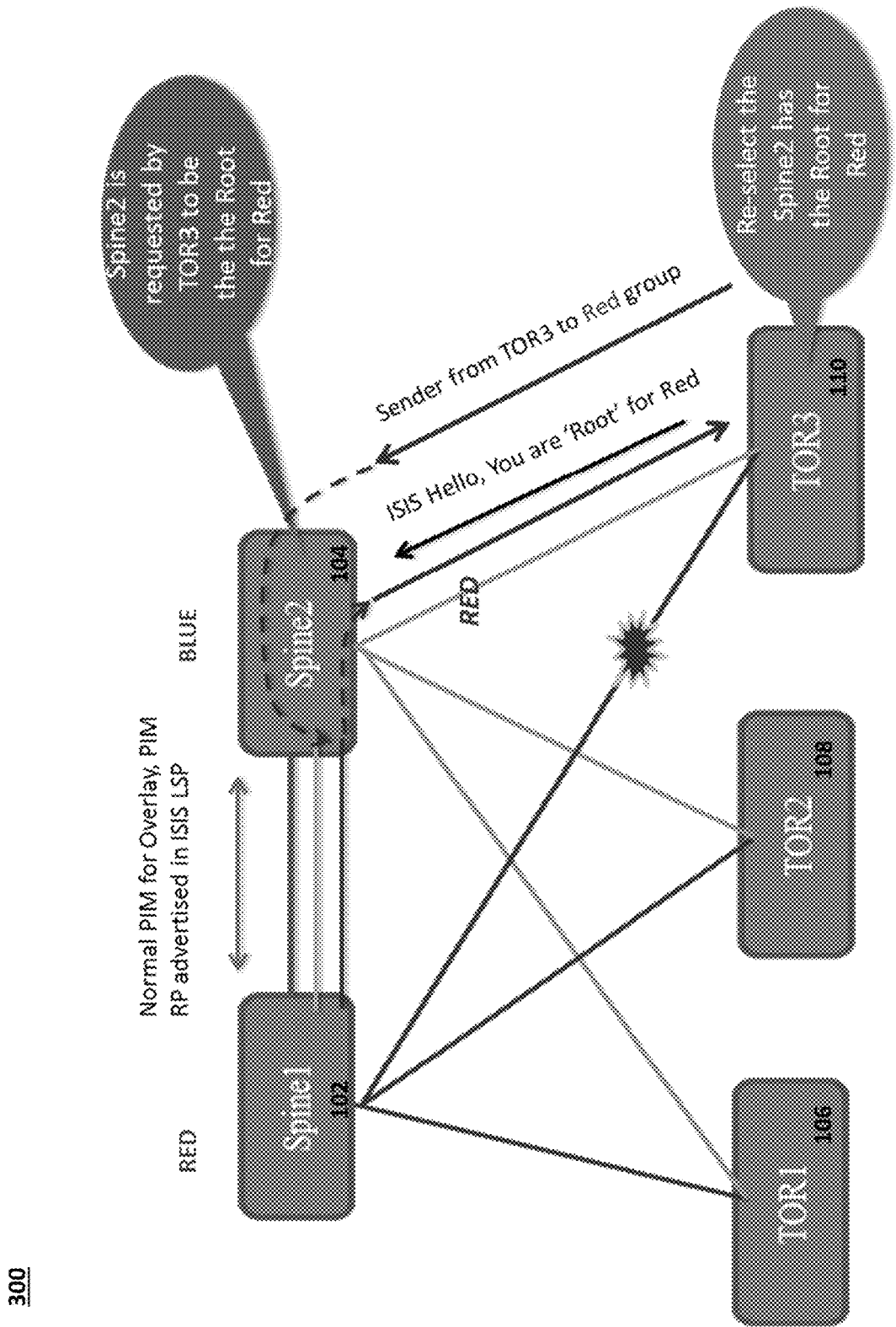
FIG. 3 is a schematic diagram of a Spine-leaf topology with a link down in accordance with embodiments of the present disclosure.

FIG. 3 is a schematic diagram of a Spine-leaf topology 300 with a link down in accordance with embodiments of the present disclosure. At the outset, Spine nodes form a PIM relationship: Spine1 102 can be the RP for "Red" group, Spine2 be the RP for "Blue" group.

Spine1 102 sends a Root indication for the overlay groups through IS-IS hello to the leaf nodes.

The leaf nodes can perform IGMP snooping on leaf nodes for Spine identifier information. Leaf nodes can convert with deterministic hash for the overlay group. Leaf nodes use IS-IS LSP to advertise existing overlay membership in packets to Spine nodes.

IS-IS on Spines will advertise their Root and inside IS-IS LSP.

When a Spine-leaf link is down, as shown in FIG. 3, the leaf node 110 will switch to the new "Root" Spine node (here, Spine node Spine2 104) for multicast operation. BFD can be used on Spine-Leaf links to fast detection of link failure. The leaf nodes can elect a new Root node for the blue group in a similar way as the initial root was selected. Spine2 104 can route the packet for group Red accordingly.

In FIG. 3, the link between Spine1 102 and TOR3 110 is down, e.g., TOR3 110 informs Spine2 that Spine1 is unreachable using IS-IS hello PDU. For multicast packets for group "Red," TOR3 110 will send packets to Spine2. Spine2 104 will replicate the multicast packet(s) to Spine1 102 (which is serving as group Red RP)/

Spine2 will replicate the Red group multicast downstream packets from RP to TOR3.

Figure 4:
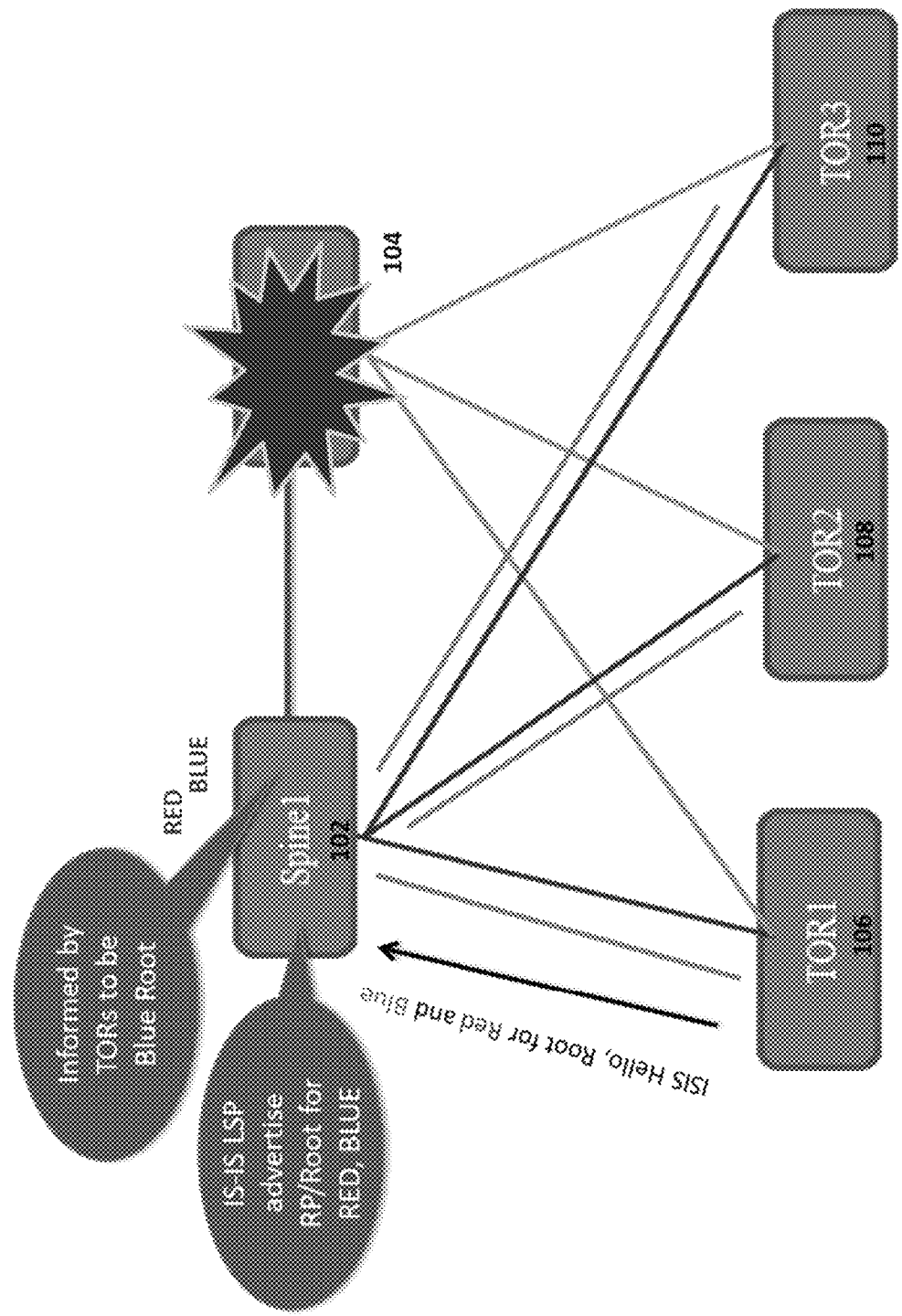
FIG. 4 is a schematic diagram of a Spine-leaf topology with a down Spine node in accordance with embodiments of the present disclosure.

FIG. 4 is a schematic diagram of a Spine-leaf topology 400 with a down Spine node in accordance with embodiments of the present disclosure. Whenever there is a Spine node down, and the "Root" for a multicast group is unreachable from a leaf node; the leaf node will switch to the new "Root" for multicast operation. In FIG. 4, Spine1 102 is designated as the new "Root" for group "Blue." The new "Root" is now responsible to replicate the multicast packet for the leaf node of the group "Blue." Bidirectional forwarding detection (BFD) can be used on Spine-Leaf links to fast detection of Spine node failure.

Spine1 102 through an IS-IS topology database, can detect that Spine2 104 is down. Spine2 in FIG. 4 was acting as Root Spine node for group Blue. The leaf nodes can elect a new Root spine for group Blue, which in FIG. 4 is depicted as Spine1.

The other Spines in the network will set RP of blue group to Spine1.

FIG. 5A is a schematic illustration of an example packet extension 500 in accordance with embodiments of the present disclosure. This extension introduces one TLV for IS-IS Hello (IIH) PDU and it is used by both Spine and leaf nodes in the Spine-Leaf mechanism. The fields of this TLV are defined as follows:

Type: TBD. 8 bits value, suggested value 150.

Length: Variable. 8 bits value. The mandatory part is 6 octets.

SL Flag: 16 bits value field for the flags shown in FIG. 5B:

FIG. 5B is a schematic diagram of an SL flag 550 in accordance with embodiments of the present disclosure. L bit (0x01): Only leaf node sets this bit. If the L bit is set in the SL flag, the node indicates it is in "Leaf-Mode."

R bit (0x02): Only Spine node sets this bit. If the R bit is set, the node indicates to the leaf neighbor that it can be used as the default route gateway.

Default Route Metric: Normal only Spine nodes set this default route metric. This default route metric is for all the address families and IS-IS topologies. A leaf node should add this metric on top of the outbound interface IS-IS metric towards the Spine node when installing the default route.

Leaf Node Operation

Figure 6A:
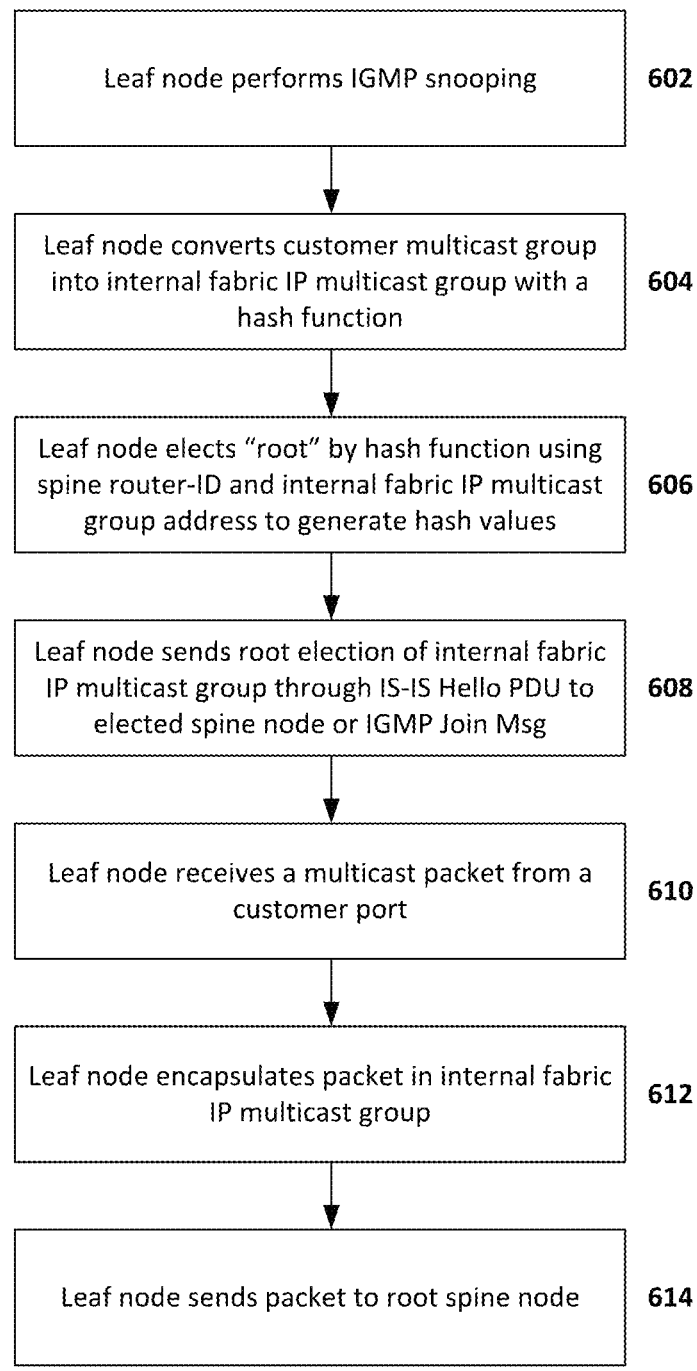
FIG. 6A is a process flow diagram for a leaf node forwarding a multicast packet in accordance with embodiments of the present disclosure.

FIG. 6A is a process flow diagram 600 for a leaf node forwarding a multicast packet in accordance with embodiments of the present disclosure. The leaf node can perform IGMP snooping (602). The leaf node can convert customer multicast group into internal fabric IP multicast group with a hash function (604). The hash function can be provisioned for each node (but has to be same on all leaf nodes) or be advertised though IS-IS LSP/Hello PDUs for operational simplicity.

The leaf node can elect a "Root" among all the connections to Spine nodes for the multicast group (606). The leaf node can use the Spine router-ID and internal fabric IP multicast group address to form a hash. Then choose the Spine with highest hash-value as "Root." (If there are parallel L3 links to the same Spine nodes, further hashing among the links will be done.) The leaf node sends the "Root" election of internal fabric IP multicast group through IS-IS hello PDUs towards the elected Spine node (608). In embodiments, the leaf node can send an IGMP join message to the elected Root spine node that indicates to the elected Spine of the election as the Root for the internal fabric IP multicast group.

The leaf node can receive a multicast packet from a customer port (610). When receiving multicast packet from customer ports, the leaf node will encapsulate packet in internal fabric IP multicast group (612), along with VRF/VLAN information. The leaf node can send the encapsulated packet towards the elected "Root" Spine node (614).

When there is a link down towards the "Root" Spine, the next Spine candidate will be picked and the leaf node informs new "Root" Spine of the change through the IS-IS hello PDU.

Figure 6B:
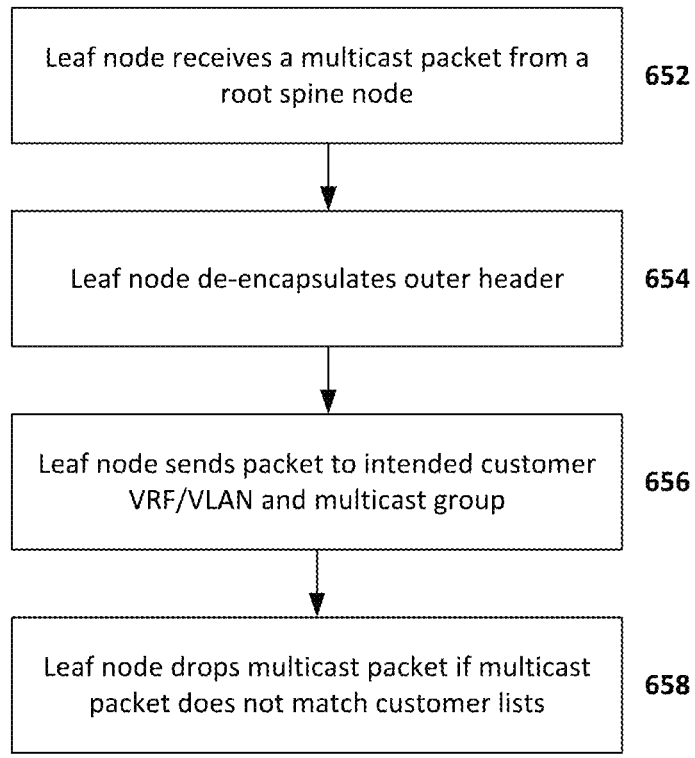
FIG. 6B is a process flow diagram for a leaf node in accordance with embodiments of the present disclosure.

Turning to FIG. 6B, FIG. 6B is a process flow diagram 650 for a leaf node to handle a multicast packet from a Root Spine node in accordance with embodiments of the present disclosure. The leaf node can receive a multicast packet from the "Root" Spine node (652). The leaf node will de-encapsulate the outer header (654). The leaf node can forward to the right customer VRF/VLAN and multicast group (656). The leaf node can drop the multicast packet if none of the local customer multicast lists match the multicast packet (658).

Spine Node Operation

FIG. 7 is a process flow diagram for a Spine node to handle a multicast packet in accordance with embodiments of the present disclosure. The Spine node can receive an IS-IS Hello PDU from a leaf node's election of "Root" for an internal IP multicast group (702). The Spine node can serve the IP multicast Root functionality for the leaf node. This basically serves as a "Join" for the internal multicast group.

The Spine node can determine whether the Spine node wants to be the Root for the multicast group (706). If the Spine node accepts Root status, the Spine node can advertise the "Root" status inside IS-IS LSP which will be flooded to all the Spine nodes (but not to leaf nodes) (708). If the Spine node denies election as a "Root" for a group, the Spine node will advertise this through the IS-IS hello PDU to the leaf nodes (e.g., in the case it has resource issue or congestion) (710).

The Spine node can run a PIM protocol among all the Spine nodes (but not towards leaf nodes) (712). The Spine node can determine whether there are multiple segments exist and multiple "Root" exist for the IP multicast group DG1 in the entire network (714). If there are multiple segments and multiple "Root" Spine nodes, the Spine nodes can elect a PIM rendezvous point (RP) using a hash function based on the router-ID of the "Root" and IP multicast group address (722). The highest number resulting from the hash functions between the various Roots can determine the PIM RP for the group. All the other non-RP "Roots" will join the RP for the multicast group (724).

The Spine "Root" receives multicast packet with internal IP multicast group DG1 (716). The Spine node replicates the multicast packet towards all leaf nodes which elected it as "Root" (718). The Spine node also replicates the multicast packet along the normal PIM tree in the Spine/core layer (720).

Variations and Implementations

Within the context of the disclosure, a network used herein represents a series of points, nodes, or network elements of interconnected communication paths for receiving and transmitting packets of information that propagate through a communication system. A network offers communicative interface between sources and/or hosts, and may be any local area network (LAN), wireless local area network (WLAN), metropolitan area network (MAN), Intranet, Extranet, Internet, WAN, virtual private network (VPN), or any other appropriate architecture or system that facilitates communications in a network environment depending on the network topology. A network can comprise any number of hardware or software elements coupled to (and in communication with) each other through a communications medium.

In one particular instance, the architecture of the present disclosure can be associated with a service provider deployment. In other examples, the architecture of the present disclosure would be equally applicable to other communication environments, such as an enterprise wide area network (WAN) deployment, The architecture of the present disclosure may include a configuration capable of transmission control protocol/internet protocol (TCP/IP) communications for the transmission and/or reception of packets in a network.

As used herein in this Specification, the term 'network element' is meant to encompass any of the aforementioned elements, as well as servers (physical or virtually implemented on physical hardware), machines (physical or virtually implemented on physical hardware), end user devices, routers, switches, cable boxes, gateways, bridges, load balancers, firewalls, inline service nodes, proxies, processors, modules, or any other suitable device, component, element, proprietary appliance, or object operable to exchange, receive, and transmit information in a network environment. These network elements may include any suitable hardware, software, components, modules, interfaces, or objects that facilitate the network service header features/operations thereof. This may be inclusive of appropriate algorithms and communication protocols that allow for the effective exchange of data or information.

In one implementation, nodes with NSH capabilities may include software to achieve (or to foster) the functions discussed herein for providing the NSH-related features/functions where the software is executed on one or more processors to carry out the functions. This could include the implementation of instances of service functions, service header processors, metadata augmentation modules and/or any other suitable element that would foster the activities discussed herein. Additionally, each of these elements can have an internal structure (e.g., a processor, a memory element, etc.) to facilitate some of the operations described herein. In other embodiments, these functions may be executed externally to these elements, or included in some other network element to achieve the intended functionality. Alternatively, these nodes may include software (or reciprocating software) that can coordinate with other network elements in order to achieve the functions described herein. In still other embodiments, one or several devices may include any suitable algorithms, hardware, software, components, modules, interfaces, or objects that facilitate the operations thereof.

In certain example implementations, the NSH-related functions outlined herein may be implemented by logic encoded in one or more non-transitory, tangible media (e.g., embedded logic provided in an application specific integrated circuit [ASIC], digital signal processor [DSP] instructions, software [potentially inclusive of object code and source code] to be executed by one or more processors, or other similar machine, etc.). In some of these instances, one or more memory elements can store data used for the operations described herein. This includes the memory element being able to store instructions (e.g., software, code, etc.) that are executed to carry out the activities described in this Specification. The memory element is further configured to store databases or metadata disclosed herein. The processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Any of these elements (e.g., the network elements, service nodes, etc.) can include memory elements for storing information to be used in achieving the NSH-related features, as outlined herein. Additionally, each of these devices may include a processor that can execute software or an algorithm to perform the NSH-related features as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Additionally, it should be noted that with the examples provided above, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that the systems described herein are readily scalable and, further, can accommodate a large number of components, as well as more complicated/sophisticated arrangements and configurations. Accordingly, the examples provided should not limit the scope or inhibit the broad techniques of using and augmenting NSH metadata, as potentially applied to a myriad of other architectures.

It is also important to note that the various steps described herein illustrate only some of the possible scenarios that may be executed by, or within, the nodes with NSH capabilities described herein. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by nodes with NSH capabilities in that any suitable arrangements, chronologies, configurations, and timing mechanisms may be provided without departing from the teachings of the present disclosure.

It should also be noted that many of the previous discussions may imply a single client-server relationship. In reality, there is a multitude of servers in the delivery tier in certain implementations of the present disclosure. Moreover, the present disclosure can readily be extended to apply to intervening servers further upstream in the architecture, though this is not necessarily correlated to the 'm' clients that are passing through the 'n' servers. Any such permutations, scaling, and configurations are clearly within the broad scope of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A computer-readable non-transitory medium comprising one or more instructions for a leaf node network element to identify a root spine node for intermediate-system to intermediate-system (IS-IS) multicast packet handling, the instructions when executed on a processor are operable to:
   identify a spine router identifier corresponding to each spine node network element among a plurality of spine node network elements connected to the leaf node network element, wherein the plurality of spine node network elements and the leaf node network element are in a computer network configured in a spine-leaf topology;
   identify a multicast group address for multicast traffic received at the leaf node network element;
   compute a plurality of hash values based on a hash function using the spine router identifier and the multicast group address;
   select the root spine node network element from the plurality of spine node network elements connected to the leaf node network element based on the plurality of hash values; and
   transmit an IS-IS message to the root spine node network element indicating the selection of the root spine node network element for the multicast traffic, wherein the IS-IS message includes a default route metric when the leaf node network element installs a default route to the root spine node network element.

2. The computer-readable non-transitory medium of claim 1, wherein the multicast group address comprises an internal fabric IP multicast group.

3. The computer-readable non-transitory medium of claim 1, wherein the instructions are further operable when executed to:
   perform a snoop on one or more multicast group members;
   identify a customer multicast groups; and
   convert the customer multicast group into an internal fabric internet protocol (IP) multicast group using a hash function.

4. The computer-readable non-transitory medium of claim 3, wherein the instructions are further operable when executed to:
   receive a multicast packet;
   encapsulate the multicast packet in the internal fabric IP multicast group; and
   send the encapsulated multicast packet to the root spine node network element.

5. The computer-readable non-transitory medium of claim 3, wherein the instructions are further operable when executed to:
   determine that a root spine node network element is non-functional;
   determine a replacement root spine node network element;
   send an IS-IS hello Protocol Data Unit (PDU) to the replacement root spine node network element; and
   receive multicast packets from the replacement root spine node network element.

6. A leaf node network element of a spine-leaf data fabric network, the leaf node network element:
   at least one memory element having instructions stored thereon;
   at least one processors coupled to the at least one memory element and configured to execute the instructions to cause the leaf node network element to:
      identify a spine router identifier corresponding to each spine node network element among a plurality of spine node network elements connected to the leaf node network element, wherein the plurality of spine node network elements and the leaf node network element are in a computer network configured in a spine-leaf topology, identify a spine router identifier;
      identify a multicast group address for multicast traffic received at the leaf node network element;
      compute a plurality of hash values based on a hash function using the spine router identifier and the multicast group address;
      select a root spine node network element from the plurality of spine node network elements connected to the leaf node network element based on a highest hash value from the plurality of hash values; and
      transmit an IS-IS message to the root spine node network element indicating the selection of the root spine node network element for the multicast traffic, wherein the IS-IS message includes a default route metric when the leaf node network element installs a default route to the root spine node network element.

7. The leaf node network element of claim 6, wherein the multicast group address comprises an internal fabric IP multicast group.

8. The leaf node network element of claim 6, wherein the instructions are further operable when executed to:
   perform a snoop on one or more multicast group members;
   identify a customer multicast groups; and
   convert the customer multicast group into an internal fabric internet protocol (IP) multicast group using a hash function.

9. The leaf node network element of claim 8, wherein the instructions are further operable when executed to:
   receive a multicast packet;
   encapsulate the multicast packet in the internal fabric IP multicast group; and
   send the encapsulated multicast packet to the root spine node network element.

10. The leaf node network element of claim 6, wherein the instructions are further operable when executed to:
   determine that a root spine node network element is non-functional;
   determine a replacement root spine node network element;

send an IS-IS hello Protocol Data Unit (PDU) to the replacement root spine node network element; and
receive multicast packets from the replacement root spine node network element.

11. A method comprising:
at a leaf node network element, identifying a spine router identifier for each spine node network element among a plurality of spine node network elements connected to the leaf node network element, wherein the plurality of spine node network elements and the leaf node network element are in a computer network configured in a spine-leaf topology;
identifying a multicast group address for multicast traffic received at the leaf node network element;
computing a plurality of hash values based on a hash function using the spine router identifier and the multicast group address;
selecting a root spine node network element from the plurality of spine node network elements connected to the leaf node network element based on the plurality of hash values; and
transmitting an intermediate system to intermediate system (IS-IS) message to the root spine node network element indicating the selection of the root spine node network element, wherein the IS-IS message includes a default route metric when the leaf node network element installs a default route to the root spine node network element.

12. The method of claim 11, wherein the multicast group address comprises an internal fabric IP multicast group.

13. The method of claim 11, further comprising:
performing a snoop on one or more multicast group members;
identifying a customer multicast groups; and
converting the customer multicast group into an internal fabric internet protocol (IP) multicast group using a hash function.

14. The method of claim 13, further comprising:
receiving a multicast packet;
encapsulating the multicast packet in the internal fabric IP multicast group; and
sending the encapsulated multicast packet to the root spine node network element.

15. The method of claim 13, further comprising:
determining that a root spine node network element is non-functional;
determining a replacement root spine node network element;
sending an IS-IS hello Protocol Data Unit (PDU) to the replacement root spine node network element; and
receiving multicast packets from the replacement root spine node network element.

16. A spine node network element of a computer network comprising a plurality of spine node network elements and a plurality of leaf node network elements configured in a spine-leaf topology, the spine node network element comprising:

at least one memory element having instructions stored thereon;
at least one processors coupled to the at least one memory element and configured to execute the instructions to cause the spine node network element to:
receive an intermediate-system-to-intermediate-system (IS-IS) hello Protocol Data Unit (PDU) from the plurality of leaf node network elements, the IS-IS hello PDU identifying the spine node network element as a root spine node network element, wherein the IS-IS hello PDU includes a default route metric when a leaf node network element installs a default route to the spine node network element;
send an IS-IS link state packet (LSP) to one or more spine node network elements in the computer network, the IS-IS LSP identifying the root spine node network element;
receive a multicast packet for a multicast group; and
transmit the multicast packet to the plurality of leaf node network elements.

17. The spine node network element of claim 16, wherein the instructions are further operable when executed to replicate the multicast packet along a protocol independent multicast tree.

18. The spine node network element of claim 16, wherein the instructions are further operable when executed to:
determine that multiple segments and multiple root spine node network elements exist for the multicast group;
calculating a hash value using a spine router identifier of the root spine node network elements and an Internet Protocol (IP) multicast group address associated with the multicast group;
electing a protocol independent multicast rendezvous point (PIM RP) spine node network element based on the hash value; and
advertising the elected PIM RP to the plurality of spine node network elements.

19. The spine node network element of claim 16, wherein the instructions are further operable when executed to:
receive an indication that the root spine node network element is non-functional from a leaf node network element, the indication identifying the leaf node network element and the multicast group;
forwarding a multicast packet for the multicast group to the leaf node network element.

20. The spine node network element of claim 16, wherein the instructions are further operable when executed to:
receive an indication that a link connecting a root spine node network element to a leaf node network element is non-functional from the leaf node network element, the indication identifying the leaf node network element and the multicast group;
receiving a multicast packet destined for the leaf node network element; and
forwarding a multicast packet for the multicast group to the leaf node network element.

* * * * *